(12) United States Patent
Kim et al.

(10) Patent No.: US 12,306,498 B2
(45) Date of Patent: May 20, 2025

(54) METHOD OF MANUFACTURING BOTTOM CHASSIS AND METHOD OF MANUFACTURING CURVED DISPLAY DEVICE, AND CURVED DISPLAY DEVICE USING THE SAME

(71) Applicant: TOVIS CO., LTD., Incheon (KR)

(72) Inventors: Yong Taek Kim, Hwaseong-si (KR);
Hwanjin Kim, Gwangmyeong-si (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 18/530,876

(22) Filed: Dec. 6, 2023

(65) Prior Publication Data

US 2024/0192546 A1 Jun. 13, 2024

(30) Foreign Application Priority Data

Dec. 8, 2022 (KR) .................. 10-2022-0170623

(51) Int. Cl.
*G02F 1/13357* (2006.01)
*G07F 17/32* (2006.01)

(52) U.S. Cl.
CPC .. *G02F 1/133608* (2013.01); *G02F 1/133602* (2013.01); *G02F 1/133603* (2013.01); *G07F 17/3216* (2013.01)

(58) Field of Classification Search
CPC ......... G02F 1/133608; G02F 1/133602; G02F 1/133603; G02F 1/133314; G02F 1/133305; G02F 2201/50; G07F 17/3216
See application file for complete search history.

(56) References Cited

U.S. PATENT DOCUMENTS

| | | | | |
|---|---|---|---|---|
| 2014/0368782 | A1* | 12/2014 | Kim | ............ G02F 1/1341 349/153 |
| 2018/0004039 | A1* | 1/2018 | Kim | ............ G02B 6/0025 |
| 2019/0151752 | A1 | 5/2019 | Kim | |
| 2019/0227369 | A1 | 7/2019 | Park et al. | |

FOREIGN PATENT DOCUMENTS

| | | |
|---|---|---|
| KR | 10-2017-0000381 A | 1/2017 |
| KR | 10-1860369 B1 | 5/2018 |
| KR | 10-2019-0089113 A | 7/2019 |
| KR | 10-2194099 B1 | 12/2020 |

* cited by examiner

*Primary Examiner* — Tracie Y Green

(74) *Attorney, Agent, or Firm* — NSIP Law

(57) ABSTRACT

A method of manufacturing a back light unit of a curved display device according to a technical aspect of the present invention is a method of manufacturing a back light unit applied to a curved display device and comprises the steps of preparing the development shape of a bottom chassis, forming a reinforcing structure on a flat plate of the development shape by roll-forming the flat plate of the development shape, bending an edge of the development shape so that an edge portion of the bottom chassis is formed to stand up on the edge of the bottom chassis, and curving the flat plate on which the reinforcing structure and the edge portion are formed to have a predetermined radius of curvature.

4 Claims, 13 Drawing Sheets

METHOD OF MANUFACTURING BOTTOM CHASSIS AND METHOD OF MANUFACTURING CURVED DISPLAY DEVICE, AND CURVED DISPLAY DEVICE USING THE SAME

CROSS-REFERENCE TO RELATED APPLICATIONS

The present application claims the benefit of Korean Patent Application No. 10-2022-0170623 filed in the Korean Intellectual Property Office on Dec. 8, 2022, the entire contents of which are incorporated herein by reference.

BACKGROUND

Field

The present invention relates to a method of manufacturing a curved display device and a curved display device using the same.

Description of the Related Art

A gaming machine is a casino gaming machine in which a gaming software such as slot machine runs to provide interest and entertainment to users and recently, various technologies have been applied to the gaming machine for enhancement of the gaming machine and for the convenience of interface.

As a major component of this gaming machine, there is a display device that displays a game to the user. Recently, a curved display device with a curved shape is applied, and this curved display device can provide users with images having improved three-dimensional and immersive effects by providing a display area of a curved shape.

This curved display device has a curved shape in which a portion of the body chassis of the display device is formed to correspond to the curved shape and the display panel is fixed to the curved shape of the body chassis. The display panel itself is soft and fluid, and thus it is curved and fixed by the body chassis.

However, in conventional arts, there are problems that it is not easy of the body chassis itself to maintain the curved shape constant, and large number of materials must be used to implement such a curved surface, resulting in increased manufacturing cost.

(Patent Document) Korean Registered Patent Publication No. 10-1860369

SUMMARY

One technical aspect of the present invention is to solve the problems in conventional arts as described above.

According to an embodiment of the present invention, it is possible to provide a method of manufacturing a curved display device and a curved display device using the same, wherein a concavo-convex reinforcement structure is formed in the longitudinal direction of the laser-developed bottom chassis using a roll-forming process, and then a bending process is performed in the longitudinal direction to achieve the curved surface of the bottom chassis, thereby enhancing the retention of the curved surface and providing the curved bottom chassis by just a simple process.

Also, according to one embodiment of the present invention, it is possible to provide a method of manufacturing a curved display device and a curved display device using the same, wherein a concave-convex reinforcement structure is formed to extend in the longitudinal direction of the bottom chassis and is formed in a pair closer to the side, thereby preventing distortion of the bottom chassis and dispersing external forces more evenly.

In addition, according to one embodiment of the present invention, it is possible to provide a method of manufacturing a curved display device and a curved display device using the same, wherein a concave-convex reinforcement structure is formed on the outside of the bottom chassis, and a fixing plate is formed by bending inward on both sides of the uneven cross section of the bottom chassis, thereby allowing external forces temporarily generated on the fixing plate during a process of fastening the display panel and the like to be relieved through the concave-convex reinforcement structure.

The problems to be solved by the present invention are not limited to the problems mentioned above, and other problems not mentioned will be clearly understood by those skilled in the art from the description below.

One technical aspect of the present invention proposes a method of manufacturing a backlight unit for a curved display device. The method of manufacturing a back light unit of a curved display device is a method of manufacturing a back light unit applied to a curved display device and may comprise the steps of preparing a development shape of a bottom chassis, forming a reinforcing structure on a flat plate of the development shape by roll-forming the flat plate of the development shape, bending an edge of the development shape so that an edge portion of the bottom chassis is formed to stand up on the edge of the bottom chassis, and curving the flat plate on which the reinforcing structure and the edge portion are formed to have a predetermined radius of curvature.

In one embodiment, the step of preparing the development shape of the bottom chassis may comprise processing the bottom flat plate in the development shape of the bottom chassis by laser-processing the bottom flat plate according to a development drawing.

In one embodiment, the flat plate of the development shape may comprise a flat plate body, and an edge portion extending from at least one side of the flat plate body.

In one embodiment, the reinforcement structure may be formed by roll-forming and bending from the flat plate body, and may be formed in the longitudinal direction of the flat plate body.

In one embodiment, the reinforcement structure may be formed as a pair to be symmetrical up and down with respect to the central portion of the flat plate body.

In one embodiment, the reinforcement structure may be formed to protrude toward the outside of the flat plate body, and wherein the edge portion may be formed to be bent toward the inside of the flat plate body.

In one embodiment, the step of curving the flat plate on which the reinforcing structure and the edge portion are formed may comprise preparing a curved forming plate having the predetermined radius of curvature, the curved forming plate including a recessed portion corresponding to the shape of the reinforcement structure, placing the flat plate body on the curved forming plate so that the outside of the flat plate body contacts the curved forming plate and the reinforcing structure is seated in the recessed portion, and forming the flat plate body according to the shape of the curved forming plate by pressing the inside of the flat plate body.

Other technical aspect of the present invention proposes a method of manufacturing a curved display device. The method of manufacturing a curved backlight unit may comprise the steps of manufacturing a curved backlight unit by forming and curving a reinforcement structure on a bottom chassis using the roll-forming, and fixing the display panel using the edge portion of the curved back light unit. The reinforcement structure may be formed by roll-forming and bending the flat plate body of the bottom chassis, and may be formed in the longitudinal direction of the flat plate body.

In one embodiment, the step of manufacturing the curved backlight unit may comprise preparing a development shape of the bottom chassis, forming a reinforcing structure on the flat plate of the development shape by roll-forming the flat plate of the development shape, bending an edge of the development shape so that an edge portion of the bottom chassis is formed to stand up on the edge of the bottom chassis, and curving the flat plate on which the reinforcing structure and the edge portion are formed to have a predetermined radius of curvature.

In one embodiment, the step of preparing the development shape of the bottom chassis may comprise processing the bottom flat plate in the development shape of the bottom chassis by laser-processing the bottom flat plate according to a development drawing.

In one embodiment, the flat plate of the development shape may comprise a flat plate body, and an edge portion extending from at least one side of the flat plate body.

In one embodiment, the reinforcement structure is formed as a pair to be symmetrical up and down with respect to the central portion of the flat plate body.

In one embodiment, the reinforcement structure may be formed to protrude toward the outside of the flat plate body, and the edge portion may be formed to be bent toward the inside of the flat plate body.

In one embodiment, the step of curving the flat plate on which the reinforcing structure and the edge portion are formed may comprise preparing a curved forming plate having the predetermined radius of curvature, the curved forming plate including a recessed portion corresponding to the shape of the reinforcement structure, placing the flat plate body on the curved forming plate so that the outside of the flat plate body contacts the curved forming plate and the reinforcing structure is seated in the recessed portion, and forming the flat plate body to be formed according to the shape of the curved forming plate by pressing the inside of the flat plate body.

Another technical aspect of the present invention proposes a curved back light unit on which a display panel is placed in a curved shape. The curved back light unit may comprise a bottom chassis that is bent in a predetermined curvature corresponding to the curvature of the display panel and includes reinforcement structure that is formed to be bent toward the outward, and an edge portion that is formed to be bent from the edge of the bottom chassis. The reinforcement structure may be formed by roll-forming and bending the flat plate body and may be formed in the longitudinal direction of the flat plate body.

In one embodiment, the bottom chassis may be formed by forming a reinforcing structure on a flat plate of the development shape by roll-forming the flat plate of the development shape, bending an edge of the development shape so that an edge portion of the bottom chassis is formed to stand up on the edge of the bottom chassis, and curving the flat plate on which the reinforcing structure and the edge portion are formed to have a predetermined radius of curvature.

In one embodiment, the reinforcement structure may be formed as a pair to be symmetrical up and down with respect to the central portion of the flat plate body.

In one embodiment, the reinforcement structure may be formed to protrude toward the outside of the flat plate body, and the edge portion may be formed to be bent toward the inside of the flat plate body.

Still another technical aspect of the present invention proposes a curved back light unit. The curved back light unit may comprise a display panel seated the back light unit of the curved display device described above and a display panel placed in the back light unit of the curved display device and bent and fixed in a predetermined curvature corresponding to the curvature of the back light unit of the curved display device.

The summary of the invention mentioned above does not enumerate all the features of the present invention. Various features for solving the problems in the conventional arts can be understood in more detail by referring to specific embodiments in the detailed description below.

According to the present invention, there are one or more effects as follows:

According to an embodiment of the present invention, there is provided with an effect that a concavo-convex reinforcement structure is formed in the longitudinal direction of the laser-developed bottom chassis using a roll-forming process, and then a bending process is performed in the longitudinal direction to achieve the curved surface of the bottom chassis, thereby enhancing the retention of the curved surface and providing the curved bottom chassis by just a simple process.

Also, according to one embodiment of the present invention, there is provided with an effect that a concave-convex reinforcement structure is formed to extend in the longitudinal direction of the bottom chassis and is formed in a pair closer to the side, thereby preventing distortion of the bottom chassis and dispersing external forces more evenly.

In addition, according to one embodiment of the present invention, there is provided with an effect that a concave-convex reinforcement structure is formed on the outside of the bottom chassis, and a fixing plate is formed by bending inward on both sides of the uneven cross section of the bottom chassis, thereby allowing external forces temporarily generated on the fixing plate during a process of fastening the display panel and the like to be relieved through the concave-convex convex reinforcement structure.

The effects of the present invention are not limited to the effects mentioned above, and other effects not mentioned will be clearly understood by those skilled in the art from the description of the claims.

DETAILED DESCRIPTION

Figure 1:
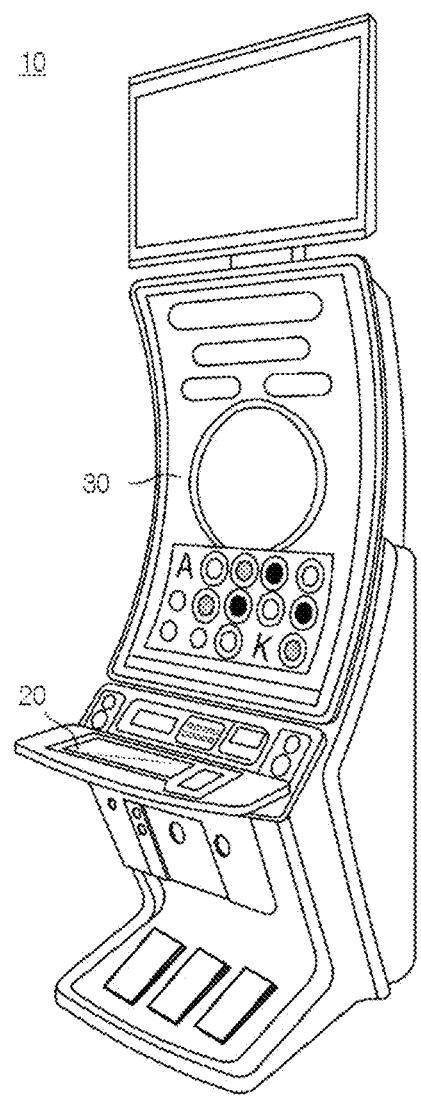
FIG. 1 is a perspective view illustrating an example of a gaming machine combined with a manipulation device for the gaming machine according to an embodiment of the present invention.

Hereinafter, preferred embodiments of the present invention will be described with reference to the attached drawings.

However, the embodiments of the present invention may be modified in various other forms, and the scope of the present invention is not limited to the embodiments described below. Also, the embodiments of the present invention are provided to more completely explain the present invention to those with average knowledge in the relevant technical field.

The various embodiments of this document and the terms as used herein are not intended to limit the technical features described in this document to specific embodiments, and should be understood to encompass various changes, equivalents, or replacements of the relevant embodiments.

In connection with the description of the drawings, similar reference numerals may be used for similar or related elements. The singular form of a noun corresponding to an item may include a single item or a plurality of items, unless the relevant context clearly indicates otherwise. In this document, each of phrases such as "A or B", "at least one of A and B", "at least one of A or B", "A, B or C", "at least one of A, B and C" and "at least one of "A, B, or C" may include any one of the items listed together in the corresponding phrase among the phrases or any possible combination thereof.

Terms such as "first", "second", "firstly" or "secondary" may be used simply to distinguish one element from another element and do not limit corresponding elements in other aspects (e.g. importance or order).

When one (e.g., first) element is referred to as "coupled" or "connected" to another (e.g., second) element, with or without the term "functionally" or "communicatively," it means that any one element may be connected to the other element directly or through a third element.

The term "module" used in this document may include a unit implemented in hardware, software or firmware, and may be used interchangeably with terms such as logic, logic block, component, or circuit, for example. A module may be integrated parts or a minimum unit of parts or a portion thereof that perform one or more functions.

Various flowcharts are disclosed to explain embodiments of the present invention, but these are for convenience of explanation of each step, and each step is not necessarily performed in accordance with the order of the flowchart. That is, each step in the flowchart may be performed simultaneously in an order according to the flowchart, or in an order opposite to the order in the flowchart.

The following description will explain, with examples, a light-receiving display panel, such as a liquid crystal display panel, an electrowetting display panel, an electrophoretic display panel and a microelectromechanical system (MEMS) display panel. However, the type of display panel is not limited to this, and the display panel may be an organic electroluminescence display panel that displays images by emitting light on its own or a plasma display panel. In this case, the light emitting source and optical film described below may be omitted.

In the following embodiments, the display panel may be flexible. That is, the initially provided shape may be flat or curved, and in the final state assembled as a curved display device, the initially provided shape may be deformed and provided in a different shape. The display panel may be bent in various ways. The display panel may be convexly curved in a downward direction or an upward direction. However, the curved direction of the display panel is not limited to this, and the display panel may be provided with a central portion of the display panel convex in an upward direction, that is, convex toward the user. Alternatively, a portion of the display panel may be provided to be convex in an upper direction and another portion thereof may be provided to be convex in a downward direction. Alternatively, the display panel may be provided in an initially curved shape, but may be provided rigidly without flexibility.

FIG. 1 is a perspective view illustrating an example of a gaming machine combined with a manipulation device for the gaming machine according to an embodiment of the present invention.

FIG. 1 shows a gaming machine 10. The gaming machine 10 itself includes a main display device 30 provided in the main body, and may display game contents on the main display device 30 to provide a game to the user.

The main body of the gaming machine 10 displays a game image on the main display 100, receives an input from a user through the manipulation input device 20 and provides the game to the user by controlling the operation of the game according to the user's input.

A control unit (not shown) of the gaming machine 10 is provided in the main body of the gaming machine, operates the game based on a manipulation signal inputted through the manipulation input device 20, and controls to display its relevant contents or events on the main display device 30.

The main display device 30 may be an individual device that may be detachably assembled into the gaming machine 10, and as shown, may be a curved display device 300 in which its display plane is curved toward the user.

Hereinafter, various embodiments of such a curved display device and various embodiments of a manufacturing method thereof will be described with reference to FIGS. 2 to 11.

Embodiment 1

Figure 2:
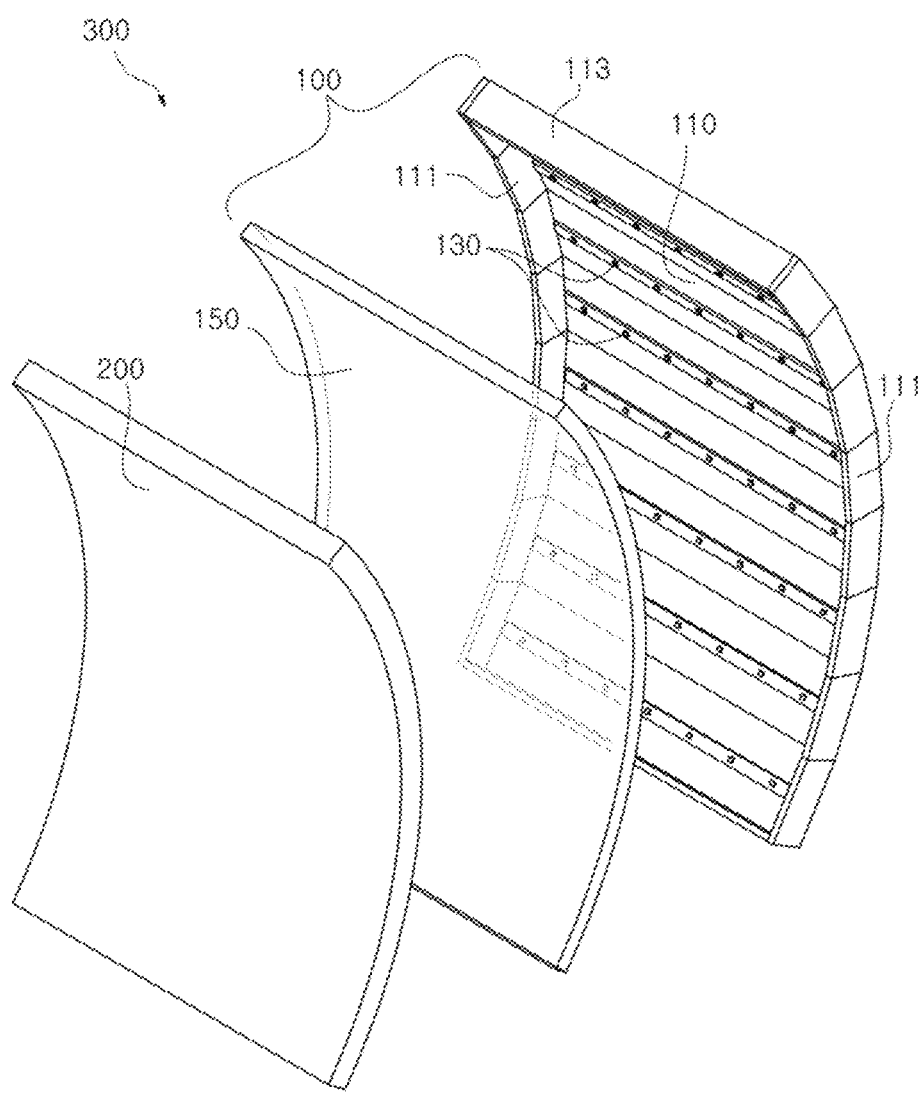
FIG. 2 is an exploded perspective view of a curved display device according to an embodiment of the present invention.
Figure 3:
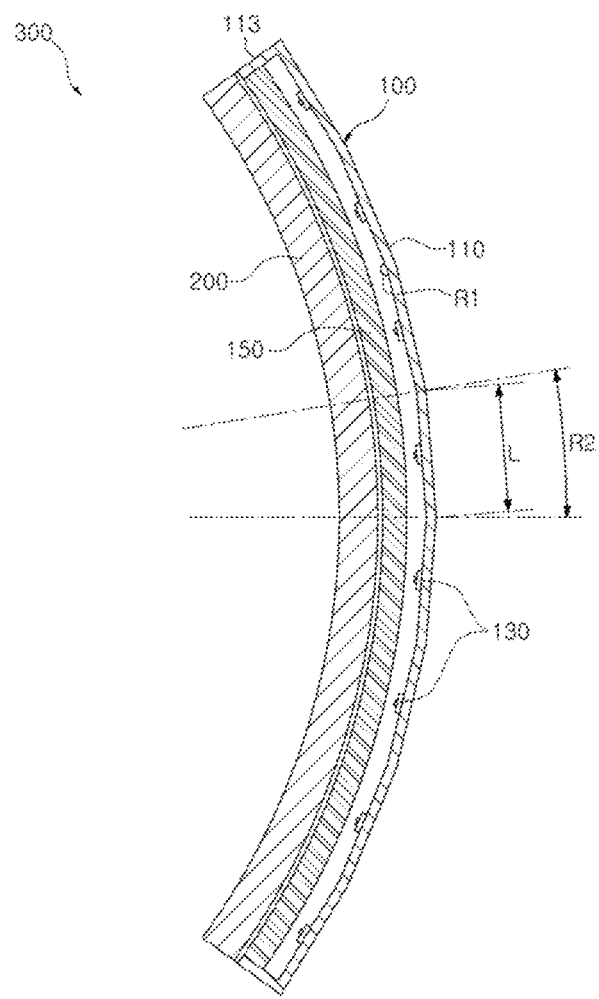
FIG. 3 is a side cross-sectional view of the curved display device shown in FIG. 2.
Figure 4:
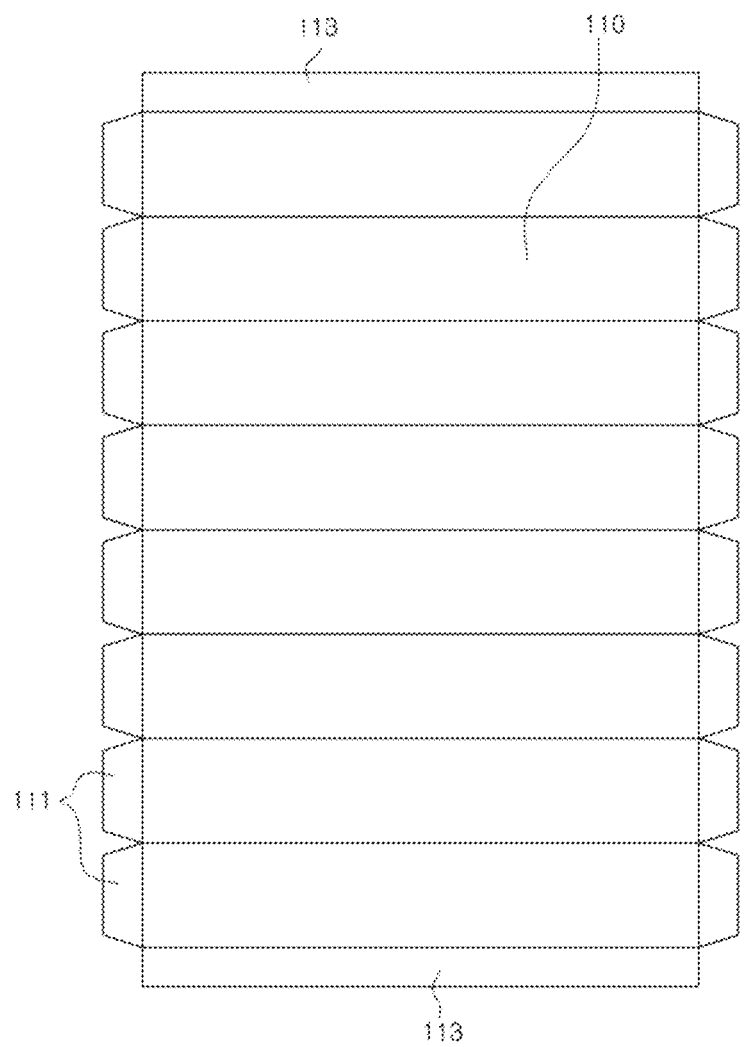
FIG. 4 is a diagram illustrating an example of a development drawing of the back plate shown in FIG. 2.
Figure 5:
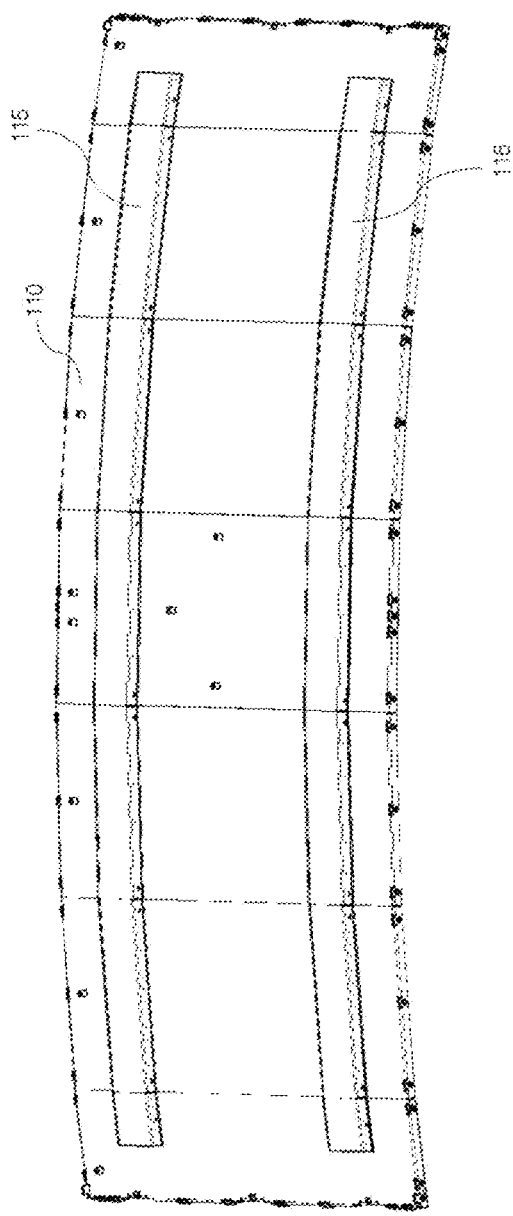
FIG. 5 is a diagram illustrating the rear surface of the curved display device shown in FIG. 2.

FIG. 2 is an exploded perspective view of a curved display device according to an embodiment of the present invention, and FIG. 3 is a side cross-sectional view of the curved display device shown in FIG. 2. FIG. 4 is a diagram showing an example of a development drawing of the back plate shown in FIG. 2, and FIG. 5 is a diagram showing the rear surface of the curved display device shown in FIG. 2.

Hereinafter, embodiments of the present invention will be described with reference to FIGS. 2 to 4.

As shown in FIGS. 2 and 3, the curved display device 300 including a back plate of a bent curved shape according to an embodiment of the present invention includes a display panel 200, and a backlight unit 100 in which the shape of at least portion thereof is formed to correspond to a curved shape so that the display panel 200 is seated in the curved shape.

The back light unit 100 may include a light source 130 and a back plate 110. Hereinafter, the body frame formed in a bent shape, i.e., the lower surface of the backlight unit, is referred to as a back plate, and the body frame formed in a curved shape without bending, i.e., the lower surface of the backlight unit, is referred to as a bottom chassis.

Hereinafter, the description is based on an embodiment employing the back plate, but details that may be applied substantially the same to an embodiment employing the bottom chassis or that can be easily applied by a person skilled in the art will not be redundantly described, which can be easily understood from the following embodiments.

The light source 130 may provide light so that the viewer can view the image displayed on the display panel 200. The light source 130 may be an LED lamp, or may be an LED module in which a plurality of LED lamps are arranged and mounted on a circuit board. In addition, a plurality of light sources 130 may be installed, and the light source 130 may be attached to the back plate 110 by adhesive, or may be attached to the back plate 110 by a fastening member such as a bolt or a rivet.

In one embodiment shown in FIGS. 1 and 2, the curved display device 300 may include a back plate 110 of a bent curved shape. The back plate 110 may support the light source 130 and may also function as a rear surface cover of the curved display device 300.

As shown in FIG. 3, the back plate 110 is a plane with a preset width L along the circumferential direction of the display panel 200 on a concentric circle with the same origin as the origin of the display panel 200 which is curved in a curved shape, it may be formed by bending so that the angle between one surface to be bent and the other surface adjacent thereto is within a preset range (hereinafter referred to as a bent curved shape), and it may be formed by bending with division at an arbitrary angle (R2) from the origin.

As an example, the back plate 110 may be formed by arranging a plurality of rectangular flat plates in the circumferential direction toward the origin of the display panel 200 to thereby have a bent curved shape.

As one example, the bent curved shape of the back plate 110 may be formed by bending one plate into a plurality of rectangular shapes. Alternatively, it may also be formed by connecting the ends of several rectangular plates to each other.

Here, the width (L) of each bent surface of the back plate 110 may be different from each other, and when there exist multiple origins of the curved surface of the display panel 200, it may be bent so that based on each origin, the angle which each surface makes to each other is different from each other.

In the drawing, although the front surface of the display panel 200 is shown as being curved concavely up and down around the horizontal axis, the display panel 200 may be curved convexly up and down around the horizontal axis and may be curved concavely or convexly left and right around the vertical axis.

FIG. 5 shows the rear surface of the back plate, and in one embodiment shown in FIG. 5, reinforcing structures 115 and 116 may be formed on the rear surface of the back plate 110. The reinforcing structures 115 and 116 may be formed in the form of being putted over at the rear surface of the back plate 110 to support the back plate 110. As an example, the reinforcement structures 115 and 116 extend in the longitudinal direction of the back plate 110 and are attached to the back plate 110, and may be fixed to the back plate 110 by screw fastening.

FIG. 4 shows an example of a development drawing of the back plate 110. As such, if the back plate 110 is formed in a bent curved shape, as shown in FIG. 4, it may be manufactured by bending a single plate and thus it can be easily manufactured without the need to produce a mold for forming as well as the manufacturing cost can be reduced, and the installation location of the light source 130 can be easily set. Furthermore, deformation and damage due to external forces that may occur when the back plate 110 is manufactured in a bent curved shape can be prevented.

In one embodiment, the surface of the back plate 110, on which the light source 130 is installed, to function as a reflective plate may be formed as a reflective surface that reflects light, and the back plate 110 may be formed from aluminum or stainless steel plate that have high heat dissipation properties and a reflective surface.

The light source 130 is installed on the back plate 110. The light sources 130 may be installed in a line at the center of the bent surface of the back plate 110 in a direct lighting manner or on one bent surface in a preset matrix form.

Here, the number of bent surfaces of the back plate 110 may be the same as the number of light sources 130 to be arranged in the circumferential direction, and the light sources 130 may also be installed not on the bent surface but on the portion where the bent surfaces meet each other, and may be installed both at a portion where the surfaces meet each other and on a flat surface.

The light source 130 may also be installed on both surfaces of the back plate 110, respectively. The edge portions 111 and 113 may protrude from a portion of the circumference of the back plate 110 or the entire circumference of the back plate 110 in a form erected against the surface of the back plate 110.

Here, a portion of the circumference of the back plate 110 may be, for example, the left and right ends of the back plate 110 or the upper and lower ends 113 of the back plate 110.

The edge portions 111 and 113 may be formed by integrally forming on the circumference of one developed back plate 110 and then bending them to stand up on the back plate 110, or may also be formed by bending the back plate 110 in a curved shape, and then forming the edges 111 and 113 to correspond to the bent curved shape such that the edges 111 and 113 are attached on circumference of the bent curved back plate 110.

In case that the edge portions 111 and 113 are formed integrally with the back plate 110, when the back plate 110 is bent in a curved shape, both end portions of the edge portions 111 and 113 may be formed to become narrower toward the outside so that they come into contact with each other without overlapping.

For example, when the portions of the edge portions 111 and 113 spread out on a plane, both ends of the edge portions 111 and 113 may be formed in a trapezoidal shape with their areas gradually becoming narrower toward the outside.

Also, when the back plate 110 is formed in a bent curved shape, the portions of the edge portions 111 and 113 that come into contact with each other may be welded so as not to separate from each other, or may be connected to each other by adhesives or fastening members such as bolts or rivets.

In the illustrated example, the edge portions 111 and 113 form the side surfaces of the back light unit, but this is exemplary and may also be implemented in a manner of fastening separate side chassis to the edge portions 111 and 113.

The light source 130 may be installed on one of or both the edge portions 111 and 113 and the bent surface of the back plate 110.

In one embodiment, the back plate 110 may include a light guide plate. The light guide plate may diffuse the light from the light source 130 into the front and rear surfaces of the back plate 110. As an example, the light guide plate may be formed to be long in the longitudinal direction of the bent surface of the back plate 110.

Optical patterns may be formed on both side surfaces of the light guide plate, respectively, to irradiate the light of the light source 130 in the direction in which the display panel 200 located on each side surface is located, and these optical patterns may be formed differently from each other, and the light guide plate may also be implemented as a light diffusion sheet 150 according to an embodiment of the light guide plate.

As an example, when light sources are respectively installed on the inner circumferences facing each other of a light source installation hole, for example, when the light sources are installed on the inner circumferences facing each other at the top and bottom of the light source installation hole or on the inner circumferences facing each other on the left and right sides of the light source installation hole, the light sources may be formed to have different patterns so that the light source 130 installed on one inner circumference of the light source installation hole irradiates the light of the light source 130 in the direction in which the display panel 200 formed with a concavely curved surface is located, and the light source 130 installed on the other inner circumference irradiates the light of the light source 130 in the direction in which the display panel 200 formed with a convexly curved surface is located.

In one embodiment, the back light unit 100 may include a light diffusion sheet 150. The light diffusion sheet 150 may diffuse the light from the linear light source 130 into the display panel 200 so that the light from the light source 130 may be uniformly irradiated to various portions of the display panel 200.

As an example, the light diffusion sheet 150 may be located at the very front of the back light unit 100 where the display panel 200 is located in order to prevent heat generated from the light source 130 from being transferred to the display panel 200. The light diffusion sheet 150 may be formed with a preset thickness to have a rigidity like the panel, and the light diffusion sheet 150 may be formed with a curved surface corresponding to the curved surface of the display panel 200.

As an example, the light diffusion sheet 150 is formed of polymer-based materials with excellent thermosetting or thermoplastic or heat resistance properties, and the light diffusion sheet 150 may be formed to be bent by its own weight by heating the light diffusion sheet 150 to have a curved surface corresponding to the curved surface of the display.

The display panel 200 may display an image and include a first substrate, a second substrate, and a liquid crystal layer located between the first substrate and the second substrate. Here, when one of the first and second substrates is a color filter substrate, the other of the first and second substrates may be a thin film transistor substrate, and the liquid crystal layer may be a polymer oriented vertically or horizontally.

The color filter substrate may be in the form of a plurality of filters overlapping each other, and the space between the first substrate and the second substrate may be sealed with a sealant to prevent the liquid crystal layer from leaking to the outside.

The display panel 200 may be placed in the front of the back light unit 100 so that an image viewing surface towards the outside, and in the case of a double-sided curved display device 300, the display panel 200 may be placed in the front and rear, respectively, with the back light unit 100 interposed therebetween.

In the above, an embodiment of a curved display device in which the backlight unit is bent and the display panel is fixed in a curved shape has been described.

Hereinafter, another embodiment of a curved display device in which the display panel is fixed to a curved surface using a back light unit including a bottom chassis formed into a curved surface will be described with reference to FIGS. 6 to 12.

Embodiment 2

Figure 6:
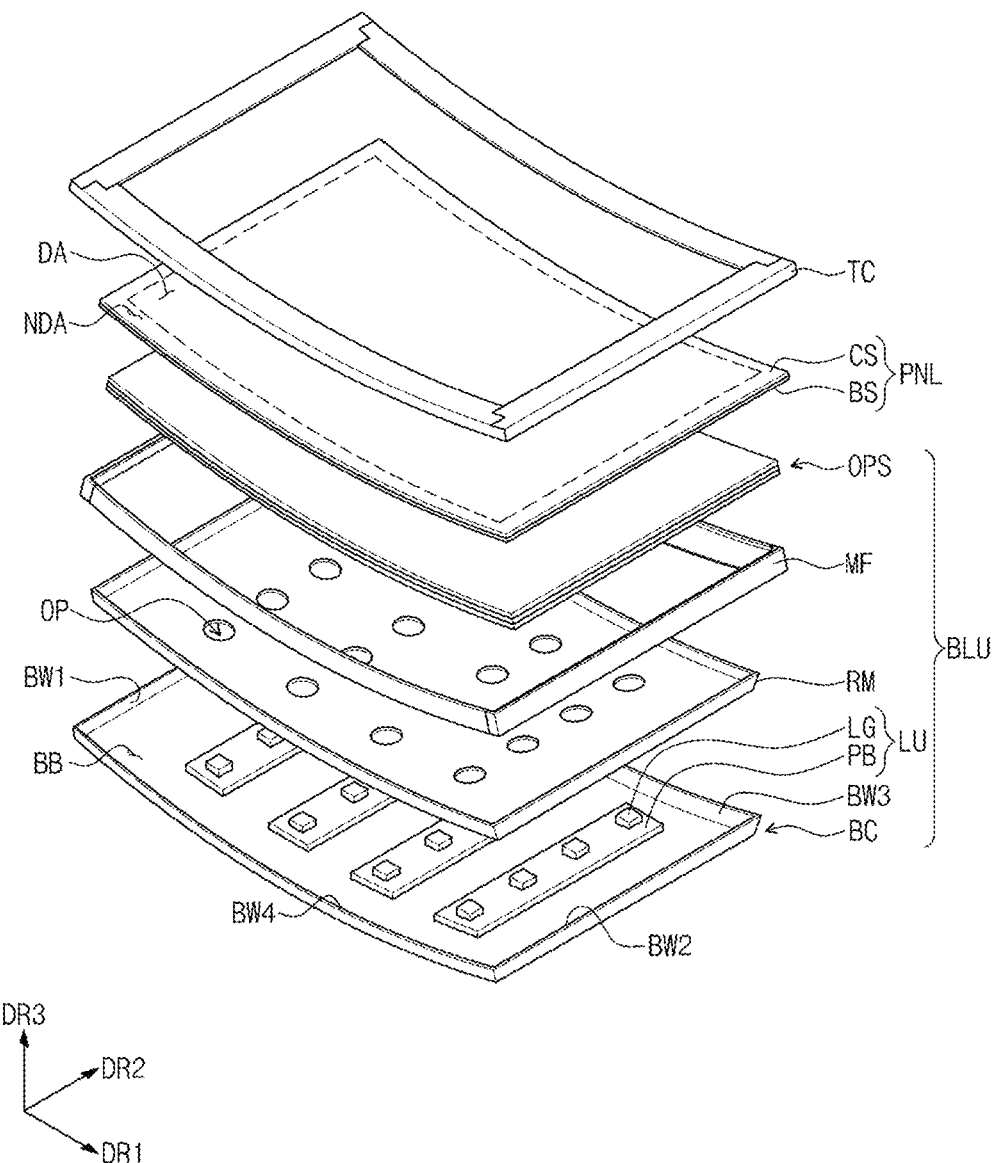
FIG. 6 is a diagram illustrating a curved display device according to an embodiment of the present invention.

FIG. 6 is a diagram illustrating a curved display device according to an embodiment of the present invention.

Referring to FIG. 6, the curved display device may have a shape that is concavely curved in the first direction (DR1) to have a predetermined radius of curvature.

The curved display device includes a display panel (PNL), a top chassis (TC), and a backlight unit (BLU). Here, for convenience of explanation, the direction in which the curved display device provides an image is referred to as the upper direction, and the direction opposite to the upper direction is referred to as the lower direction. However, the upper direction or the lower direction is a relative concept and may be converted to another direction.

The display panel (PNL) displays an image. In the illustrated example, the display panel (PNL) is indicated in a rectangular shape with a pair of long sides and a pair of short sides in which the extension direction of the long side is indicated as a first direction (D1), and the extension direction of the short side is indicated as a second direction (DR2) perpendicular to the first direction (DR1). The image is provided in a third direction (DR3) perpendicular to the first direction (DR1) and the second direction (DR2).

In one embodiment of the present invention, a shape that the display panel (PNL) is curved concavely along the first direction (DR1) will be described as an example. A shape that when the display panel (PNL) is cut in the first direction (DR1), the cross section of the final shape of the display panel (PNL) is bent concavely in the lower direction to have a predetermined radius of curvature will be described as an example. In this specification, the radius of curvature means the radius of curvature when a certain plane has been cut in a direction perpendicular to the plane along a curved direction. However, the display panel (PNL) may be provided in a curved shape along the first direction (DR1) and the second direction (DR2) in other embodiment. Additionally, in another embodiment, it should be considered that the display panel (PNL) may be bent in a direction other than the first direction (DR1) and the second direction (DR2).

Here, when the user is located at a specific location from the display panel (PNL), the distance from the user to the edge of the display panel (PNL) and the distance from the user to the center of the display panel (PNL) may be substantially the same and therefore, the image may be viewed by the user without distortion.

The display panel (PNL) has a display area (DA) where an image is displayed and a non-display area (NDA) provided on at least one side of the display area (DA).

The display panel (PNL) includes a base substrate (BS), an opposing substrate (CS) facing the base substrate (BS), and a liquid crystal layer (not shown) formed between the base substrate (BS) and the opposing substrate (CS). The edge of the display panel (PNL) is covered with the top chassis (TC). According to one embodiment of the present invention, the base substrate (BS) may include a plurality of pixel electrodes (not shown) and a plurality of thin film transistors (not shown) electrically connected to the pixel electrodes in one-to-one correspondence. Each thin film transistor switches a driving signal provided to the corresponding pixel electrode. Additionally, the opposing substrate (CS) may include a common electrode (not shown) that forms an electric field that controls the array of the liquid crystals together with the pixel electrodes. The display panel (PNL) serves to display images on the front by driving the liquid crystal layer.

The top chassis (TC) is provided on the top of the display panel (PNL). The top chassis (TC) covers the front edge of the display panel (PNL), that is, the non-display area (NDA). A display window (WD) is formed on the top chassis (TC) to expose the display area (DA) of the display panel (PNL). The top chassis (TC) may include plastic, aluminum, or stainless steel. The top chassis (TC) may be bent according to the radius of curvature of the display panel (PNL).

The backlight unit (BLU) is to provide light to the display panel (PNL) and is provided at the bottom of the display panel (PNL). The backlight unit (BLU) may include light source unit (LU) for providing light to the display panel (PNL), a bottom chassis (BC), a reflective member (RM), optical sheets (OPS), and a mold frame (MF) for supporting the optical sheets (OPS).

The light source unit (LU) generates light. In one embodiment of the present invention, the light source unit (LU) may include a printed circuit board (PB) and a plurality of light emitting diode packages (LG) mounted on the printed circuit board (PB) to generate light.

The printed circuit board (PB) may be provided in a rectangular plate extending in the second direction (DR2). A plurality of printed circuit boards (PB) may be provided, and the plurality of printed circuit boards (PB) may be spaced apart from each other in the first direction (DR1) and arranged side by side. However, the printed circuit board (PB) may be provided as a rectangular plate extending in the first direction (DR1) or as a single rectangular plate corresponding to the surface facing the display panel (PNL), which is not necessarily limited thereto.

A plurality of light emitting diode packages (LG) may be arranged in a line along the extending direction of the printed circuit board (PB).

The bottom chassis (BC) may accommodate the light source unit (LU). The bottom chassis (BC) has a curved shape according to the curved form of the display panel (PNL).

The bottom chassis (BC) may be formed with a reinforcing structure, and this reinforcing structure may enhance the retention of the curved surface of the bottom chassis. This bottom chassis will be described with reference to FIG. 7.

The bottom chassis (BC) includes a bottom portion (BB) facing the display panel (PNL) and a plurality of side wall portions (BW1 to BW4) bent from the bottom portion (BB). The bottom portion (BB) is a curved surface that is concavely curved in the first direction (DR1) and that has a predetermined radius of curvature. A light source unit (LU) may be disposed on the bottom portion (BB).

The side wall portions (BW1 to BW4) may be divided into a first side wall portion (BW1) and a second side wall portion (BW2) that are disposed to be spaced apart from each other in the first direction (DR1) with the bottom portion BB interposed therebetween, and a third side wall portion (BW3) and a fourth side wall portion (BW4) that are disposed to be spaced apart from each other in the second direction (DR2) and that are curved along a curved surface.

Figure 7:
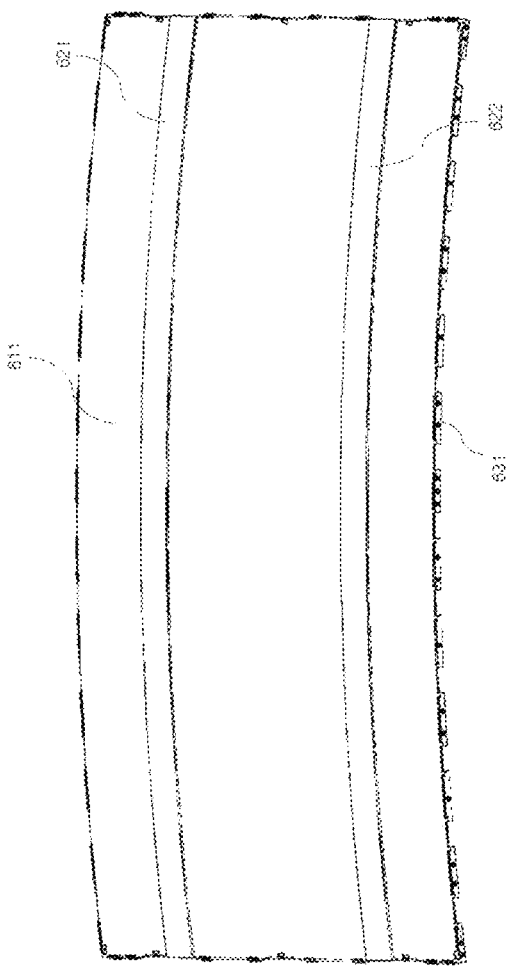
FIG. 7 is a diagram illustrating the bottom chassis of a back light unit according to an embodiment of the present invention.

In the illustrated example, the side wall portions (BW1 to BW4) are formed in the form of having surfaces, but this is an exemplary, and as another example, an edge portions may be formed in place of the side wall portions (BW1 to BW4) as shown in FIG. 7.

The reflective member (RM) may be disposed on the light source unit (LU). The reflective member (RM) may be accommodated in the bottom chassis (BC) with the light source unit (LU) interposed therebetween. The reflective member (RM) may change the path of light toward the display panel (PNL) by reflecting the light emitted from the light source unit (LU) that is not provided to the display panel (PNL) but leaks. The reflective member (RM) may include a material such as polyethylene terephthalate (PET) or aluminum (Al) that reflects light. The reflective member (RM) is bent with a predetermined radius of curvature.

Optical sheets (OPS) are provided between the light source unit (LU) and the display panel (PNL). The optical sheets (OPS) serve to control light emitted from the light source unit (LU). The optical sheets (OPS) may include a diffusion sheet, a prism sheet and a protection sheet which are laminated on the reflective member (RM).

The diffusion sheet diffuses light. The prism sheet serves to condense the light diffused from the diffusion sheet in a direction perpendicular to the plane of the upper display panel (PNL). Most of light that passes through the prism sheet is incident perpendicularly to the display panel (PNL). The protective sheet is positioned on the prism sheet. The protective sheet protects the prism sheet from external impact. In this embodiment, although the example in which the optical sheets (OPS) each include a diffusion sheet, a prism sheet and a protection sheet has been presented, it is not limited thereto.

The optical sheets (OPS) may be used by laminating at least one of the diffusion sheet, the prism sheet and the protection sheet in multiple sheets, and any one or more sheets may be omitted as needed. Additionally, the diffusion sheet, prism sheet and protection sheet may be laminated in different orders.

In one embodiment of the present invention, the optical sheets (OPS) may be bent to have the same radius of curvature as the display panel (PNL).

The mold frame (MF) is provided along the edge of the display panel (PNL) and supports the display panel (PNL) at a lower portion of the display panel (PNL). Also, the mold frame (MF) may support the optical sheets (OPS) disposed at a lower portion of the display panel (PNL).

The mold frame (MF) may have the display panel (PNL) and the optical sheets (OPS) or other element, for example, a fixing member (for example, a catching protrusion (not shown)) for fixing or supporting a portion of the light source unit (LU). The mold frame (MF) may be provided at a position corresponding to four sides of the display panel (PNL) or at a position corresponding to at least a portion of the four sides. For example, the mold frame (MF) may have a square ring shape corresponding to the four sides of the display panel (PNL) or may have a U-shape corresponding to three sides of the edge of the display panel (PNL). The mold frame (MF) may be integrally formed as a single piece, but may be formed in plural pieces and assembled as needed. The mold frame (MF) may be made of an organic material such as polymer resin. However, it is not limited to this, and may be made of other materials as long as it has the same shape and function.

The mold frame (MF) may be bent along the radius of curvature of the display panel (PNL).

The mold frame (MF) may be jointly fixed with the side wall portions (BW1 to BW4) or the edge portion (631 in FIG. 7).

FIG. 6 shows the bottom chassis of the back light unit, and this bottom chassis is provided at the rear surface of the back light unit.

The bottom chassis is bent in a predetermined curvature corresponding to the curvature of the display panel and includes reinforcing structures 621 and 631 that are bent to the outward.

The bottom chassis may be formed by forming a reinforcement structures by roll-forming a flat plate of the development shape of the bottom chassis, bending the edge of the development shape so that the edge portion stands up on the edge of the bottom chassis, and curving the flat plate on which the reinforcement structures and edge portions are formed to have a predetermined radius of curvature. A description regarding this will be provided below with reference to FIGS. 8 to 13.

As an example, a light emitting source may be provided in the inner space of the reinforcement structures 621 and 631, and a polarizing film may be provided in close contact with the bottom chassis. Through this, a more slim light emission and polarization configuration may be provided.

The reinforcement structures 621 and 631 are formed by roll-forming the flat plate body 611 of the bottom chassis and may be formed in the longitudinal direction of the flat plate body. These reinforcing structures 621 and 631 enable to maintain the curved shape of the bottom chassis even when it is formed in a curved surface without bending, and may prevent deformation such as warping due to external force.

The reinforcing structures 621 and 631 may be formed as a pair to be vertically symmetrical with respect to the central portion of the flat plate body.

By forming these reinforcement structures 621 and 631, the body of the bottom chassis may be implemented in a plane shape rather than a bent shape.

On the side surface of the bottom chassis may be formed the edge portion 631 formed by bending the edge of the bottom chassis. The mold frame (MF in FIG. 6) or a side surface chassis (not shown) may be fastened and fixed to the edge portion 631 as a side surface portion of the curved back light unit.

As in the illustrated example, the reinforcing structures 621 and 631 are formed to protrude toward the outside (that is, the lower portion) of the flat plate body and the edge portion 631 is formed to be bent toward the inside (that is, the upper portion) of the flat plate body.

Figure 8:
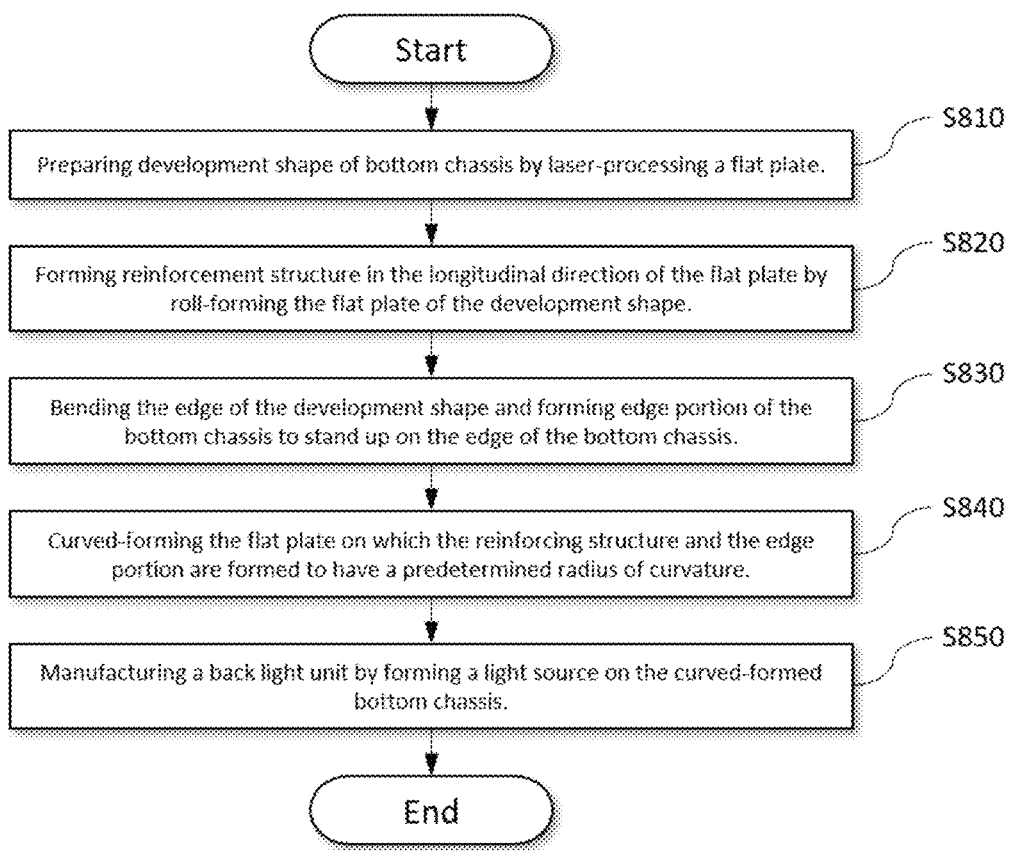
FIG. 8 is a diagram illustrating a method of manufacturing a back light unit of a curved display device according to an embodiment of the present invention.

FIG. 8 is a diagram illustrating a method of manufacturing a back light unit (that is, a bottom chassis) of a curved display device according to an embodiment of the present invention, and FIGS. 9 to 13 are diagrams explaining each step in a method of manufacturing the back light unit of the curved display device shown in FIG. 8.

Referring to FIG. 8, a bottom flat plate for forming the bottom chassis is prepared and it is laser-processed according to a development drawing, and then the bottom flat plate is processed in the development shape of the bottom chassis (S810).

Figure 9:
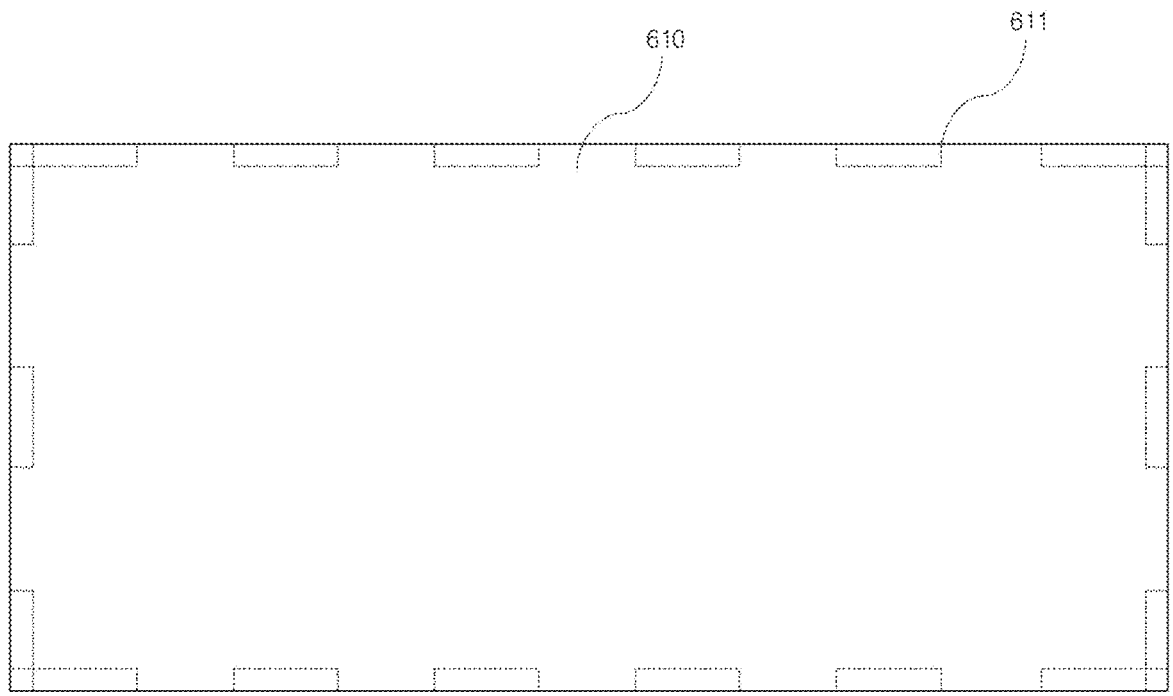
FIGS. 9 to 13 are diagrams illustrating a method of manufacturing a back light unit of the curved display device shown in FIG. 8.

FIG. 9 shows these steps, and by applying the development drawing 611 considering the development shape to the bottom flat plate 610 and then laser-processing it, the remaining portion excluding the edge portion may be removed.

Figure 10:
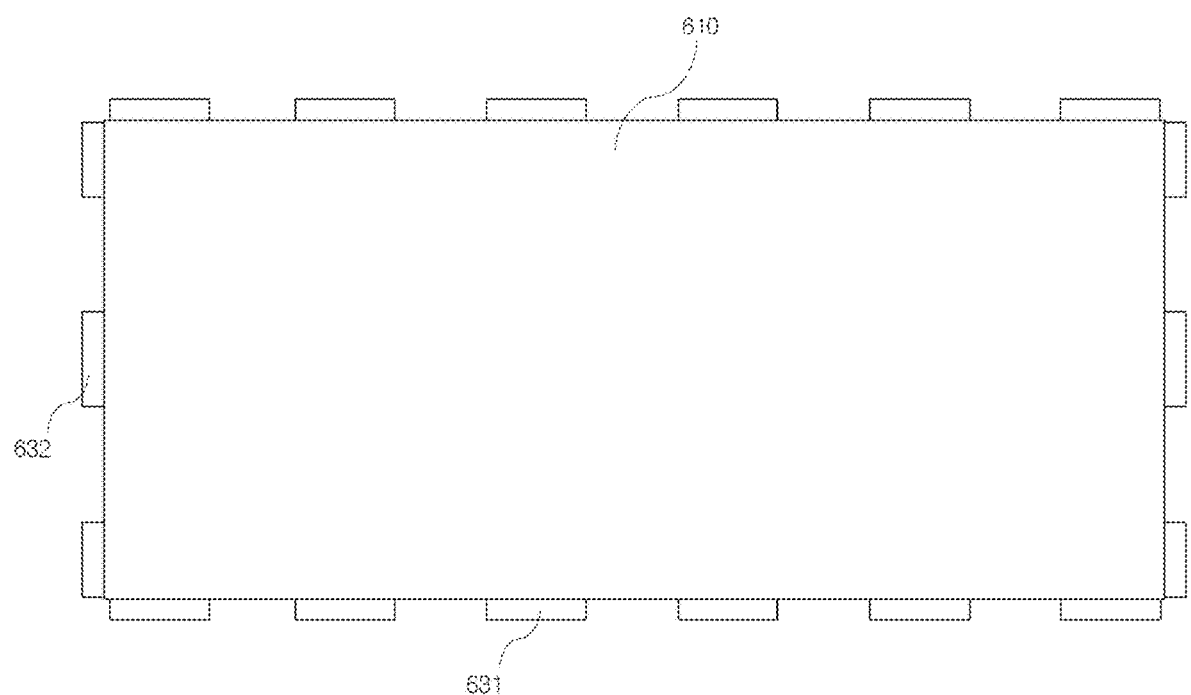

FIG. 10 shows the bottom flat plate of the development shape after such laser processing. The bottom flat plate of the development shape includes a flat plate body 610 and edge portions 631 and 632 extending from at least one side of the flat plate body.

Thereafter, a reinforcement structures may be formed on the flat plate of the development shape by roll-forming the flat plate of the development shape (S820). That is, the reinforcing structures may be formed through a roll-forming process which presses a roller on a plane and may be protruded to have a step in one direction according to the shape of the roll.

Figure 11:
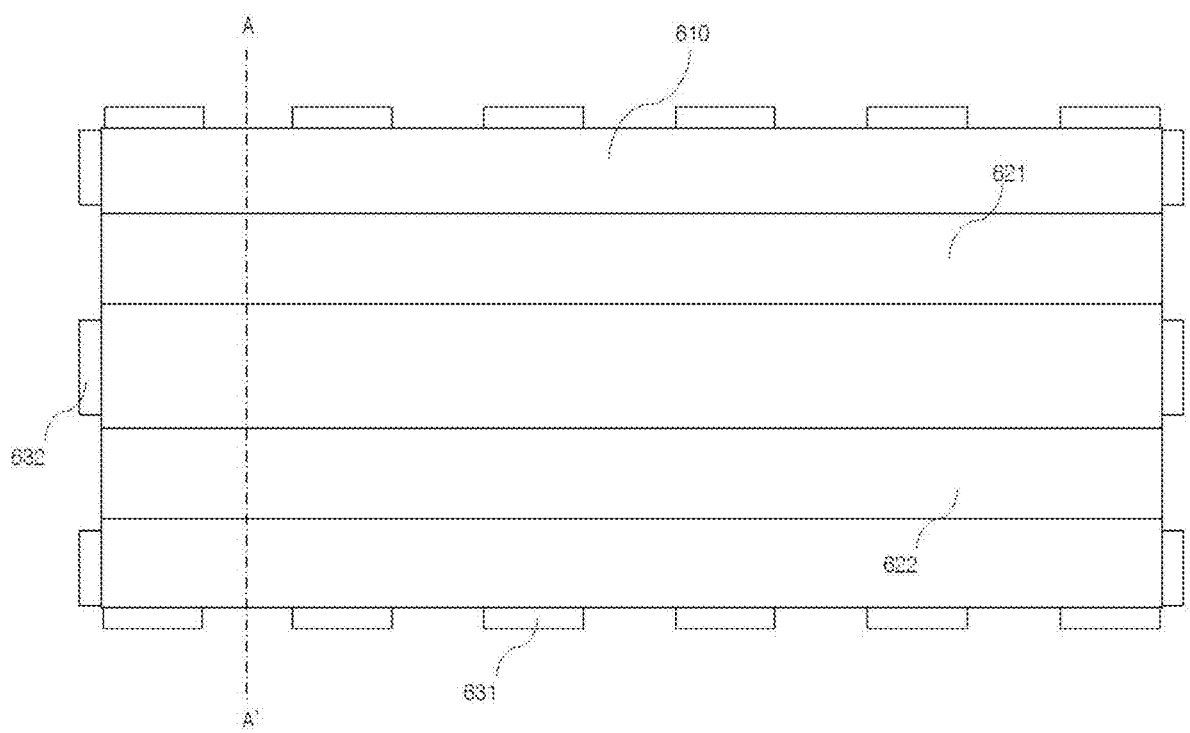
Figure 12:
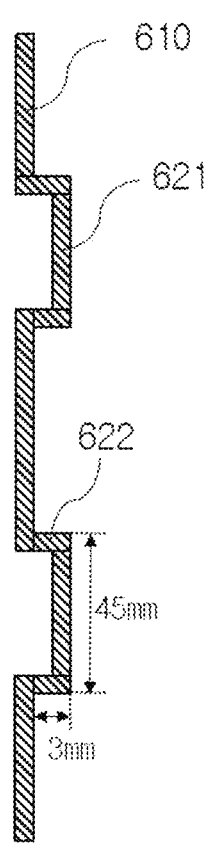

FIG. 11 illustrates a plan view of the bottom chassis on which the reinforcing structures 621 and 622 are formed by this roll-forming, and FIG. 12 shows a cross-sectional view taken along line A-A' of FIG. 11.

As shown in FIGS. 11 and 12, the roll-formed reinforcement structures 621 and 622 are formed by bending a flat plate body.

As an example, the reinforcing structures 621 and 622 may be formed to have a width of 15 to 100 mm and a depth of 1 to 5 mm and extend in the longitudinal direction. In the illustrated embodiment, the reinforcing structures 621 and 622 are formed to extend in the longitudinal direction with a width of 45 mm and a depth of 3 mm.

Thereafter, the edge of the development shape may be bent so that the edge portion of the bottom chassis is formed to stand up on the edge of the bottom chassis (S830). That is, the edge portion 631 may be formed to stand up vertically in a plane through a bending process.

Figure 13:
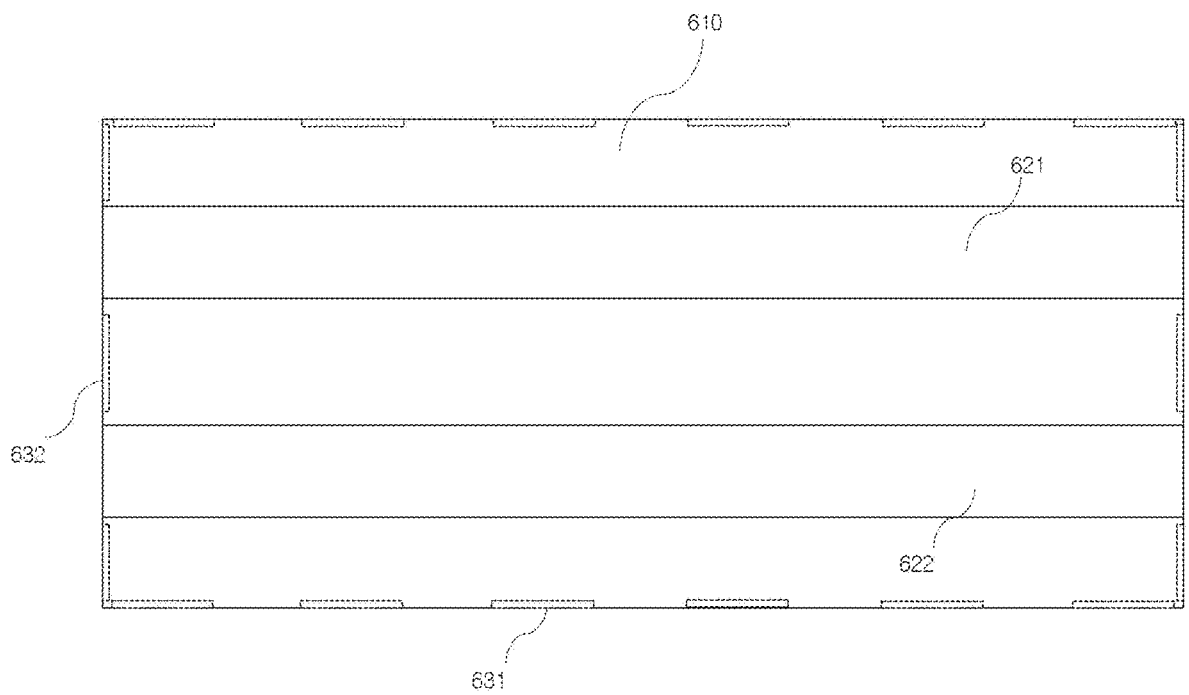

FIG. 13 shows a state that this bending process is completed. In the illustrated example, it can be seen that the formation direction of the reinforcement structures and the formation direction of the edge portion are different from each other. That is, the reinforcing structures may be formed to protrude toward the outside (lower portion) of the flat plate body, whilst the edge portion may be formed to be bent toward the inside (upper portion) of the flat plate body.

Thereafter, the flat plate on which the reinforcing structure and the edge portion are formed may be curved and formed to have a predetermined radius of curvature (S840).

In one embodiment, this curved forming may be implemented through a pressed-forming process. For example, a curved forming plate having a predetermined radius of curvature may be prepared. Here, the curved forming plate may include a recessed portion corresponding to the shape of the reinforcement structures. Thereafter, the flat plate body may be placed on the curved forming plate so that the outside of the flat plate body contacts the curved forming plate and the reinforcing structures are seated in the recessed portion. This state is the state that a bottom chassis body of the plane shape is rested on the curved forming plate. Thereafter, the flat plate body may be pressed-formed according to the shape of the curved forming plate by pressing the inside (upper portion) of the flat plate body.

This curved forming is an exemplary, and various other methods may be applied. For example, the roll-forming process and the curved forming process may be implemented as one process using an extrusion forming roller.

As discussed above, in Embodiment 2, these reinforcement structures 621 and 622 may be formed by a simple roll process and therefore, they may be produced with fast and accurate yield through a simpler process than the above-described Embodiment 1 which requires the reinforcement members to be assembled according to the bent shape.

The present invention described above is not limited by the above-described embodiments and the accompanying drawings, but it is limited by the scope of the claims described below. Those skilled in the art can easily see that the configuration of the present invention can be variously changed and modified within the scope without departing from the technical spirit of the present invention.

The invention claimed is:

1. A curved back light unit on which a display panel is disposed in a curved shape comprising,
a bottom chassis comprising: a back plate that is bent in a predetermined curvature corresponding to a curvature of the display panel; and a reinforcement structure disposed on a rear surface of the back plate; and
an edge portion disposed to be bent from an edge of the bottom chassis,
wherein the reinforcement structure is disposed along the predetermined curvature of the back plate, and
wherein the rear surface of the back plate is a distal surface from a center of the predetermined curvature.

2. The curved back light unit of claim 1, wherein the bottom chassis is formed by:
forming the reinforcement structure on a flat plate of a development shape by roll-forming the flat plate of the development shape;
bending an edge of the development shape so that the edge portion of the bottom chassis is formed to stand up; and
curving the flat plate on which the reinforcing reinforcement structure and the edge portion are formed to have the predetermined curvature.

3. The curved back light unit of claim 1, wherein the reinforcement structure is disposed as a pair to be symmetrical up and down with respect to a central portion of the back plate.

4. The curved back light unit of claim 1, wherein the reinforcement structure is disposed to protrude away from the center of the predetermined curvature, and wherein the edge portion is disposed to be bent toward the center of the predetermined curvature.

* * * * *